United States Patent [19]

Pesapane

[11] Patent Number: 5,150,867

[45] Date of Patent: Sep. 29, 1992

[54] SUPPORT MEMBER

[76] Inventor: Joel J. Pesapane, 3954 W. Pine, St. Louis, Mo. 63108

[21] Appl. No.: 505,915

[22] Filed: Apr. 6, 1990

[51] Int. Cl.[5] ............................................. A01G 9/02
[52] U.S. Cl. .................................... 248/213.2; 42/72; 42/32
[58] Field of Search ..................... 248/213.2, 530, 545, 248/156; 47/72, 32, 25, 84, 41.1, 41.11, 41.12, 41.13, 41.14; 206/423

[56] References Cited

U.S. PATENT DOCUMENTS

| | | |
|---|---|---|
| 608,590 | 8/1898 | Freund . |
| 2,005,467 | 6/1935 | Menge ................................. 47/41.11 |
| 2,110,981 | 3/1936 | Auslander ................................. 41/10 |
| 3,618,260 | 4/1970 | Convey, Jr. ............................. 47/32 |
| 4,014,506 | 3/1977 | Hanson .............................. 248/311.1 |
| 4,208,836 | 6/1980 | Kramer ................................... 47/72 |
| 4,300,312 | 11/1981 | Weder et al. ........................... 47/72 |
| 4,791,755 | 12/1988 | Bilstein ................................... 47/66 |

FOREIGN PATENT DOCUMENTS

| | | | |
|---|---|---|---|
| 2078479 | 1/1982 | United Kingdom ................... 47/32 |
| 2213693 | 8/1989 | United Kingdom ................... 47/72 |

Primary Examiner—Robert W. Gibson, Jr.
Attorney, Agent, or Firm—Heller & Kepler

[57] ABSTRACT

A support member for a plant container for supporting decorative dressings placed within the plant container around a planting contained therein and pertains, has a collar for placement around a plant. The collar includes extensions and projections that support conventional decorative finishes used with the associated plant container or containers, for example, mulch, bark, moss, or similar materials.

22 Claims, 2 Drawing Sheets

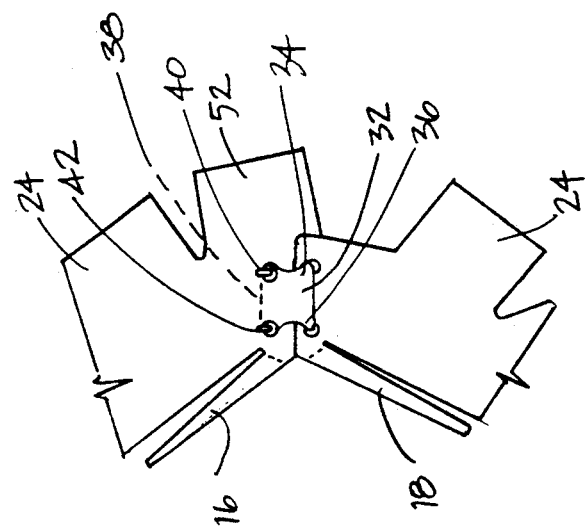
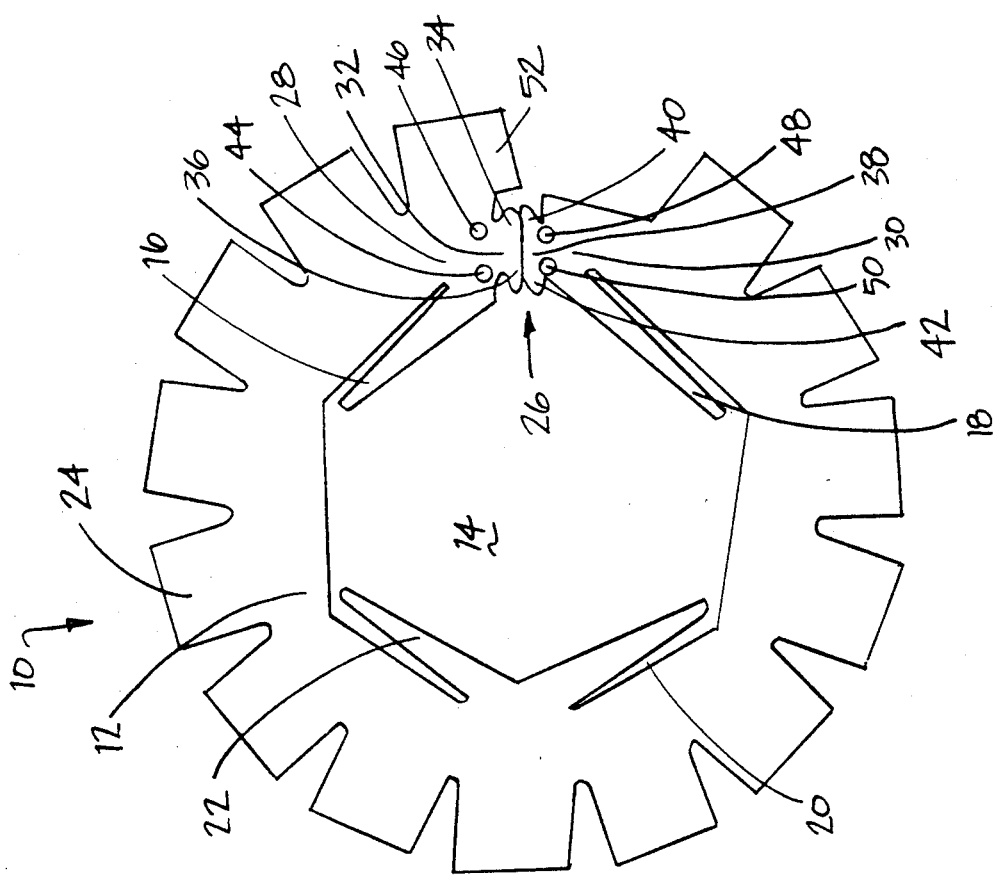

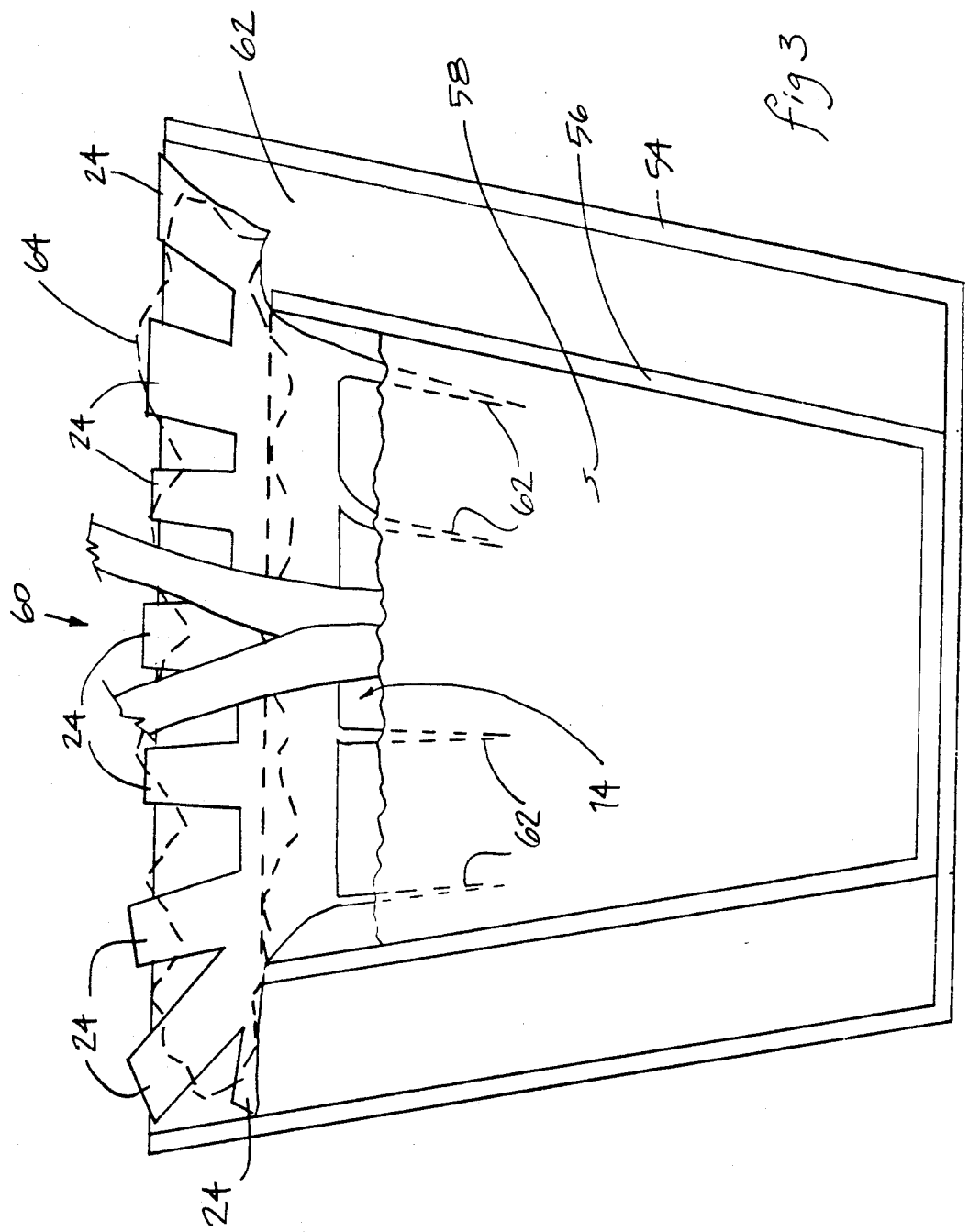

SUPPORT MEMBER

BACKGROUND OF THE INVENTION

The present invention relates in general to a support member for use with a planting container arrangement for supporting decorative dressings placed within the plant container and around a planting contained therein and pertains, more particularly to a support member for placement around a plant that supports decorative finishes used in the plant container. The support member of this invention is an improvement over the conventional systems and methods used to provide a desired decorative finish with conventional materials, such as, mulch, bark, and moss.

With the conventional planter arrangements it is generally necessary to cover a planter with decorative materials to hide a gap between an outer decorative pot and an inner grow pot. The conventional grow pot is placed within the outer decorative container leaving the intermediate gap into which the decorative covering falls and collects.

This is a conventional arrangement for interior plants placed in office settings. However, the conventional planter and grow pot arrangement does not permit easily placing a decorative mulch, bark, or moss directly around the plant as described above.

Installing and maintaining interior plantings is a time and labor intensive business. A nursery, florist or other business may supply, service and maintain plants in several offices or business. Maintaining plantings often require the removal of the existing plant from the decorative container and exchanging the old with a new plant. The old plant can then be brought back to the shop to undergo additional procedures such as re-potting, grafting or trimming.

Maintenance of these decorative plantings requires the removal of the grow pot from within the decorative container. The decorative topping or dressing material (e.g., mulch, bark, decorative stones, or moss) that was added to provide an aesthetically pleasing presentation must be removed. This operation is time consuming and often produces a mess around the decorative pot.

Another drawback associated with conventional decorative plantings is that the gap between the grow pot and the outer decorative container contains a filler to keep the dressing material from between the pots. The filler may include styrofoam particles or blocks shoved or wedged in between the pots.

The conventional arrangment includes a further drawback especially when the dressing is taken out and the pots separated, then it is desirable to separate the quantity of dressing from the filler. As a result, maintaining the planting becomes a two-step process for both removing and replacing the plant and its grow pot in the ornamental outer pot.

Presently, there is no product specifically designed to assist in the operation of removing the decorative mulch or bark or moss from around the plant. Prior art teaches various types of pots and decorative containers, jardiniere, supports for pots, substrates and pot coverings.

Accordingly, it is the object of the present invention to provide a support member for supporting a decorative dressing material used in conjunction with a decorative pot for a plant or another pot and its plant. With the support member of this invention it has been found that the top dressing material is easily removed with little mess or waste of the dressing material.

Another object of the present invention is to provide a support member having an associated structure and functional appendages for generally stabilizing the support member, supporting the top dressing actually above the pot, and locking the support member in a generally circular shape. The support member of this invention assists in reducing the labor and time involved in removing a plant and its associated grow pot from a decorative container and, if desired, placing another grow pot and plant in the decorative container.

A further object of the present invention is to provide a support member that is adjustable and thereby adaptable for use with various sizes of grow pot and decorative containers combinations.

Still another object of the present invention is to provide a support member that is economical to use and inexpensive to manufacture.

Still a further object of the present invention is to provide a support member that provides a supporting surface for conventional top dressing materials.

Another object of the present invention is to provide a support member that may be used more than once. The support member is manufactured from a material that can be periodically cleaned.

SUMMARY OF THE INVENTION

To accomplish the foregoing and other objects of this invention there is provided support member further referred to as a support member for supporting decorative material or top dressings, typically for use in conjunction with a grow pot and decorative container. The support member comprises a collar means for generally enclosing a plant within the container.

The collar means in the illustrated embodiment includes extensions from the collar means adaptable for insertion into a soil portion of the container and projections also extending from the collar means for supporting a quantity of the dressing material. The support member of this invention substantially separate the top dressing from the plant and associated containers by supporting the decorative material generally above the plant and container arrangement.

The collar member generally defines an opening through which the plant may extend. In the disclosed embodiment described herein, there are provided tabs that are bent generally upwards to form a bowl shaped support surface for containing the dressing material. When two plant containers are used, an inner grow pot and an outer decorative container, the grow pot nests inside the outer container and the tabs extend across the gap created by the nesting arrangement. The tabs obstruct the dressing material from descending into the gap.

The collar means includes a closure means for maintaining the support member in a desired overall shape. In the described embodiment the collar is generally circular.

In operation, the support member is generally circular and planar with a center opening through which a plant may extend. Two ends are provided for allowing the collar to be placed around a plant. The collar is slightly bent or twisted to space apart the opposing ends and to allow the collar to be placed around the plant.

The collar being made of a material that will allow such bending and twisting to occur and return back to its original shape. The collar is then lowered to the top of the grow pot within the decorative container and the decorative mulch, bark, moss or other top dressing is placed on the support. The decorative mulch, bark or the like can then be easily removed by raising the collar and tilting the pot or pot and container while brushing off the decorative material. The collar is opened and removed allowing the plant to be changed or maintained.

Upon completion of plant maintenance, the collar is replaced and the same top dressing replaced on the support collar, if desired, or new top dressing may be applied.

These and other objects and features of the present invention will be better understood and appreciated from the following detailed description of one embodiment thereof, selected for purposes of illustration and shown in the accompanying drawings.

BRIEF DESCRIPTION OF THE DRAWINGS

FIG. 1 is a plan view of a support member constructed in accordance with the present invention;

FIG. 2 is a partial plan view of the support member depicted in FIG. 1 with a closure system illustrated in a closed position; and FIG. 3 is a sectional side view of the support member in use with a grow pot and decorative container.

DETAILED DESCRIPTION

Referring now to the drawing there is shown a preferred embodiment for the support member or plant collar of this invention. The plant collar is described in connection with a conventional nested grow pot and decorative pot arrangement. It should be recognized that the plant collar of the present invention can be made in various sizes to accommodate the variety of sizes in pots and decorative container and that the physical design and shape of the plant collar can be varied from the illustrations included herewith.

The drawings show a support member or plant collar 10 that generally encloses a plant as further described below. A collar means includes a generally circular collar portion 12. The collar portion defines a center opening 14 for receiving a plant. The collar means further includes extensions from the collar portion. The extensions stabilize the collar within its respective planting arrangement. In a preferred embodiment the extensions are fingers 16-22 that extend into the interior opening of the collar.

The support member or collar includes projections that are adapted to support a quantity of decorative or dressing material and maintain the material separate from and generally above the plant and pot arrangement. In a preferred embodiment the plant collar 10 includes a plurality of tabs 24 extending outward from the plant collar 10. The collar 10 is preferably of a material that allows tabs 24 to be bent generally upward so as to form a bowl shaped support surface for containing the decorative material.

It will be understood that as tabs 24 are bent upwards the outer diameter of the plant collar 10 is reduced. This feature allows a plant collar 10 to be used with a variety of container sizes. Bending the tabs further facilitates the formation of the bowl shaped support surface and, it will be recognized, the bent tabs function to hold and stabilize the plant collar 10 in position. This feature assists the finger extensions to stabilize the collar.

The plant collar 10 provides a closure means 26 used to fix the plant collar 10 in position. The plant collar 10 includes a opposing collar ends 28 and 30 defined by a separation of the collar portion 14 by an imaginary line. In a preferred embodiment the line is along a radii from a center of the collar.

The opposing collar ends 28 and 30 are readily separable, for example, by slightly bending or twisting the plant collar 10. This provides for easy plant collar installation. The opposing collar ends 28 and 30 provide the closure means and are designed such that a fastener portion is formed. In use, the closure means allows repeated installation and removal of the collar 10. The opposing collar ends provide respective closure means.

A closure tab 32 defines a first respective wing member 34 and a second respective wing member 36. Another closure tab member 38 on opposing collar end 30 defines its first respective wing member 40 and its second respective wing member 42. A plurality of wing receiving openings 44-50 are provided to receive their respective tab members. Operation of the closure means is described in greater detail below in cooperation with FIG. 2.

The closure means is incorporated into the collar while still providing a desired end tab 52. Thus, the closure means is readily adapted to the support member without interfering with use of the present invention. The one end tab overlays the other end tab. The wings of the upper end insert down and into the receiving openings. The other, lower end tab wings are inserted up and into the receiving openings. This provides one preferred closure means that does not interfere with the other operation of the collar 10.

In operation, in connection with a conventional grow pot 56, the pot 56 contains soil 58 and a plant 60. An annular channel or gap 62 results from nesting the grow pot 56 in an outer or decorative container 54. The desired effect is illustrated in FIG. 3 in which a quantity of a decorative cover or top dressing 64 is indicated. The top dressing may be a mulch, bark, moss, or stone material used in conventional plantings, particularly in office or commercial environments.

The collar 10 is initially placed around the plant 60. The extensions or finger members 16-22 are bent about the broken lines shown in FIGS. 1 and 2 generally at the base of each extension. These extensions go into the soil to support and stabilize the collar 10. In the preferred embodiment four extensions are illustrated in FIG. 1 and an embodiment illustrated in FIG. 3 includes additional tabs and extensions.

Once the plant collar 10 is placed around the plant 60, the plant collar 10 is lowered into the decorative container 54 and the extensions inserted into the soil. The tabs 24 are bent upwards so that the plant collar 10 will fit substantially inside the decorative container 54. The tabs 24 are bent upwards so that the plant collar 10 will fit inside of the decorative container 54 and rest upon upper edge of the container 54 and generally above the grow pot 56. Decorative cover 64 rests on top of the collar 10 to provide the desired aesthetically pleasing appearance.

The decorative cover or dressing 64 is readily removed by lifting the plant collar 10 and brushing the cover onto the floor or container for re-use.

From the foregoing description those skilled in the art will appreciate that all of the objects of the present invention are realized. A support member for supporting a decorative dressing material for use in conjunction with a decorative pot for a plant or another pot and its plant are provided. With the support member of this invention the top dressing material is easily removed with little mess or waste of the dressing material.

The collar or support member provides associated structure and functional appendages for generally stabilizing the support member, supporting the top dressing actually above the pot, and locking the support member in a generally circular shape. The result is a support member that reduces the labor and time involved in removing a plant and its associated grow pot from a decorative container and, if desired, placing another grow pot and plant in the decorative container.

The collar or support member is adjustable and thereby adaptable for use with various sizes of grow pot and decorative containers combinations. It will be understood that the support member provides a convenient supporting surface for conventional top dressing materials. The collar of this invention may be reused and periodically cleaned if manufactured from a suitable material.

While a specific embodiment has been shown and described, many variations are possible. The particular shape and design of the plant collar may vary as can the particular shape and design of the associated extensions and projections associated with the ends and center opening of this invention. The collar materials may vary although a flexible, fire-resistant or fire-retardant material is preferred. The configuration, size and number of extensions and projections may vary. It is preferred to manufacture this invention in a number of sizes than can be used in a variety of pot and containers.

Having described the invention in detail, those skilled in the art will appreciate that modifications may be made of the invention without departing from its spirit. Therefore, it is not intended that the scope of the invention be limited to the specific embodiment illustrated and described. Rather, it is intended that the scope of this invention be determined by the appended claims and their equivalents.

What is claimed is:

1. A support member for use in association with a plant container containing a plant, the support member for supporting decorative dressings, comprising:
   collar means for generally enclosing a plant within a container, the collar means having opposing end portions, the collar means formed of a generally pliant material and in use contorted to bring the opposing end portions into a generally proximate relationship and during storage is generally planar;
   extensions from the collar means adapted for insertion into an amount of soil contained in a soil receiving portion of the container; and
   projections from the collar means adaptable for supporting a quantity of a dressing material and maintaining the dressing material substantially separate from the plant and associated containers.

2. A support member as set forth in claim 1 wherein the collar means is a generally circular shaped portion of the support member.

3. A support member as set forth in claim 2 wherein the collar means defines an opening through which the plant is adapted to extend.

4. A support member as set forth in claim 1 wherein the projections extend generally outward and away from the collar means.

5. A support member as set forth in claim 4 wherein the projections are tab members extending outward from the collar means.

6. A support member as set forth in claim 5 wherein the tabs are bendable members for bending generally upwards to form a bowl shaped support surface for containing the dressing material.

7. A support member as set forth in claim 6 wherein the plant container nests inside another container and the tabs are adapted to at least partially overly the outer most container to obstruct the dressing material from descending into the gap created between the two containers.

8. A support member as set forth in claim 1 wherein the collar means includes closure means for maintaining the support member in a desired overall shape by fastening opposing ends of the collar means.

9. A support member as set forth in claim 8 wherein the closure means includes a pair of opposing ends, each of the respective opposing ends defining at least one tab and corresponding tab receiving openings, the opposing tab and tab receiving opening providing cooperating tabs and tab receiving openings for fastening opposing ends of the collar means.

10. A support member as set forth in claim 9 wherein the closure means is reusable.

11. A support member as set forth in claim 10 wherein the closure means includes opposing tab members on opposing end members of the collar means, and one end member overlays the other end member with the upper tab members inserted down through the receiving openings and the lower tab members inserted up through respective receiving openings and forming the desired closure.

12. A support member for use in association with a plant container, the support member for supporting decorative dressings, comprising:
    collar means for generally enclosing a plant within a container, the collar means providing a generally circular shaped portion of the support member, the collar means defining an interior opening;
    extensions from the collar means adaptable for insertion into an amount of soil contained in a soil receiving portion of the container, the extensions extending from the collar means and inward into the interior opening, the extensions generally pliant and bendable into the soil insertion position; and
    projections from the collar means adaptable for supporting a quantity of a dressing material substantially separate from the plant and associated containers, the projections extend generally outward and away from the collar means.

13. A support member as set forth in claim 12 wherein the projections are tab members extending outward from the collar means.

14. A support member as set forth in claim 13 wherein the tabs are bendable members for bending generally upwards to form a bowl shaped support surface for containing the dressing material.

15. A support member as set forth in claim 14 wherein the plant container nests inside another container and the tabs are adapted to at least partially overly the outer most container to obstruct the dressing material from descending into the gap created between the two containers.

16. A support member as set forth in claim 12 wherein the collar means includes closure means for maintaining the support member in a desired overall shape by fastening opposing ends of the collar means.

17. A support member as set forth in claim 16 wherein the closure means includes a plurality of tab and receiving openings, with cooperating tabs and openings located on opposing ends of the collar means.

18. A support member as set forth in claim 17 wherein the closure means is reusable.

19. A support member as set forth in claim 18 wherein the closure means includes opposing tab members on opposing end members of the collar means, and one end member overlays the other end member with the upper tab members inserted down through the receiving openings and the lower tab members inserted up through respective receiving openings and forming the desired closure.

20. A support member as set forth in claim 1 wherein the support member remains substantially planar when not in use.

21. A support member for use in association with a plant container, the support member for supporting decorative dressings, comprising:

collar means for generally enclosing a plant within a container, the collar means having opposing end portions, the collar means formed of a generally pliant materials and in use contorted to bring the opposing end portions into a generally proximate relationship;

a closure means on the opposing ends for maintaining the support member in a desired overall shape by fastening opposing ends of the collar means, the closure means including a pair of opposing ends, each of the respective opposing ends defining at least one tab and corresponding tab receiving openings, the opposing tab and tab receiving openings providing cooperating tabs and tab receiving openings for fastening opposing ends of the collar means, one end member overlays the other end member with the upper tab members inserted down through the receiving openings and the lower tab members inserted up through respective receiving openings and forming the desired closure, and the closure means being reusable;

extensions from the collar means abaptable for insertion into an amount of soil contained in a soil receiving portion of the container; and projections from the collar means adaptable for supporting a quantity of a dressing material and maintaining the dressing material substantially separate from the plant and associated containers.

22. A support member for use in association with a plant container, the support member for supporting decorative dressings, comprising:

collar means for generally enclosuring a plant within a container, the collar means providing a generally circular shaped portion of the support member, the collar means defining an interior opening;

a closure means for maintaining the support member in a desired overall shaped by fastening opposing ends of the collar means, the closure means includes a plurality of tab and receiving openings, with cooperating tabs and openings located on opposing ends of the collar means, one end member overlays the other end member with the upper tab members inserted down through the receiving openings and the lower tab members inserted up through respective receiving openings and forming the desired closure, and the closure means being reusable;

extensions from the collar means adaptable for insertion into an amount of soil contained in a soil receiving portion of the container, the extensions extending from the collar means and inward into the interior opening; and projections from the collar means adaptable for supporting a quantity of a dressing material substantially separate from the plant and associated containers, the projections extend generally outward and away from the collar means.

* * * * *